United States Patent [19]

Ramunas

[11] 4,163,514
[45] Aug. 7, 1979

[54] ADJUSTABLE STOCK FEED

[75] Inventor: Valdas S. Ramunas, Euclid, Ohio

[73] Assignee: Acme-Cleveland Corporation, Cleveland, Ohio

[21] Appl. No.: 794,918

[22] Filed: May 9, 1977

[51] Int. Cl.$^2$ .................... B65H 51/18; B65H 51/32
[52] U.S. Cl. ................................ 226/141; 74/89.21; 414/14
[58] Field of Search ............... 226/141, 142, 139, 138, 226/137, 136, 135; 271/144, 139, 267–269; 214/1.1, 1.2, 1.3, 1.4, 1.5, 1.6, 1.7; 74/89.21, 89.22, 89.2, 108; 82/2.5, 2.7

[56] References Cited

U.S. PATENT DOCUMENTS

| | | | |
|---|---|---|---|
| 2,763,365 | 9/1956 | Pulman | 226/141 |
| 2,779,590 | 1/1957 | Seastrom | 226/141 X |
| 3,814,299 | 6/1974 | Spercel | 226/162 |
| 3,917,143 | 11/1975 | Yourkievitz | 226/141 |

OTHER PUBLICATIONS

Eisenhart, L. P. *A Treatise on the Differential Geometry of Curves and Surfaces*, Athenaum Press, Boston, 1909, pp. 43–47.

Primary Examiner—Bruce H. Stoner, Jr.
Attorney, Agent, or Firm—Pearne, Gordon, Sessions

[57] ABSTRACT

An adjustable feed mechanism is disclosed to feed elongated stock to a machine, for example, elongated bar stock to a machine tool, so that successive parts may be machined in the machine tool, cut off, and then a new length of bar stock of the proper length fed to the machine tool for the next cycle of operation. The adjustable feed mechanism includes a stock pusher to push the bar stock to the spindle of the machine tool and an actuator means is provided, such as a spring urging the stock pusher forwardly as controlled by a stock feed cam and cam follower. A cable pulley is journaled on an arm moved by the cam follower to have a constant length stroke. A flexible cable is connected to actuate the stock pusher and encompasses part of the cable pulley and then has a variable anchor on an involute curve as a fixed anchor point on the frame of the machine. By changing the anchor point along this involute curve a continuously variable amount of feed of the bar stock is achieved with a constant forward feed position of the stock pusher. The foregoing abstract is merely a resume of one general application, is not a complete discussion of all principles of operation or applications, and is not to be construed as a limitation on the scope of the claimed subject matter.

19 Claims, 5 Drawing Figures

ADJUSTABLE STOCK FEED

BACKGROUND OF THE INVENTION

Single spindle and multiple spindle automatic bar machine tools are examples of machines which require elongated bar stock to be fed to the machine tool intermittently. The bar stock is gripped in a collet in the spindle and rotated so that the end of the bar may be cut into the shape desired and then cut off. Next the collet is opened and the bar stock is fed forwardly to engage a stock stop and then the collet is closed ready for the next cycle of operation. This feed forward of the bar stock might be only a small amount if small length parts are being machined or may be a long length if long parts are being machined. The prior art machine tools have known various forms of mechanisms to provide this adjustable length bar feed. One of the earlier arrangements was to use a cam drum within the machine tool and to have a supply of stock feed cams on hand which could be interchangeably fastened on the cam drum. In this way a stock feed could be selected and secured to the cam drum which would provide a stock feed only slightly greater than that actually required for the workpieces to be successively machined. One would have needed an infinite number of such stock feed cams in order to achieve an infinitely adjustable stock feed. Since as a practical consideration this was not possible the machine tool user generally had about six or eight cams of graduated lengths, for example, for a maximum of seven inches of stock feed and a minimum of one-inch of stock feed. If the machine tool user had a part to be machined which was 1.1 inches long then he had to use the next longer cam, for example, one of two-inch stock feed, which meant that the stock feed fingers or pusher fingers would slide on the surface of the bar stock for 0.9 inches of length and this would often mar the surface finish or it would cause undue stress on the stock stop because the rear stock was moving forward rapidly at the time it struck the stock stop.

Other manufacturers used some additional mechanism in series after this first cam drum. The first cam drum still gave a fixed length of stroke but then through interconnected levers with a variable interconnection point or another cam with a changeable angle thereon, an adjustable length of stroke to the stock pusher was achieved. The disadvantages of these arrangements were the added complexity with more mechanism causing more lost motion, more mechanism needing to be manufactured by the machine tool manufacturer and also needing adjustment at the time of changing of the stock feed length.

Accordingly the problem to be solved is how to achieve an adjustable bar stock feed mechanism which would be infinitely adjustable, easy to manufacture and adjust and one which has a constant maximum forward feed position regardless of the amount of feed.

SUMMARY OF THE INVENTION

The problem is solved utilizing an adjustable feed mechanism for feeding elongated stock to a machine, comprising, in combination, a frame, a stock feeder positioned to feed elongated stock to the machine, a support member mounted for movements in a path on said frame, actuator means connected to move said support member in said path through a given length stroke, a member having a curved track, a transversely flexible elongated linkage, means to connect said linkage to act between said actuator means and said stock feeder and engaging at least part of said curved track, one of said connection means and said curved track including a volute curve, and adjustable means connected to utilize a different portion of said volute curve to change the length of elongated stock feed to the machine.

Accordingly, an object of the invention is to provide an adjustable stock feed mechanism which utilizes a volute curve for achieving an infinitely adjustable bar feed with a constant maximum forward position.

Another object of the invention is to provide an adjustable feed mechanism utilizing a flexible linkage such as a flexible cable which can readily follow an involute curve.

Another object of the invention is to provide a linkage which will be a motion multiplying linkaging so that the stock may be moved farther than the fixed length of stroke of the actuator means.

Other objects and a fuller understanding of the invention may be had by referring to the following description and claims, taken in conjunction with the accompanying drawing.

DESCRIPTION OF THE PREFERRED EMBODIMENT

Figure 1:
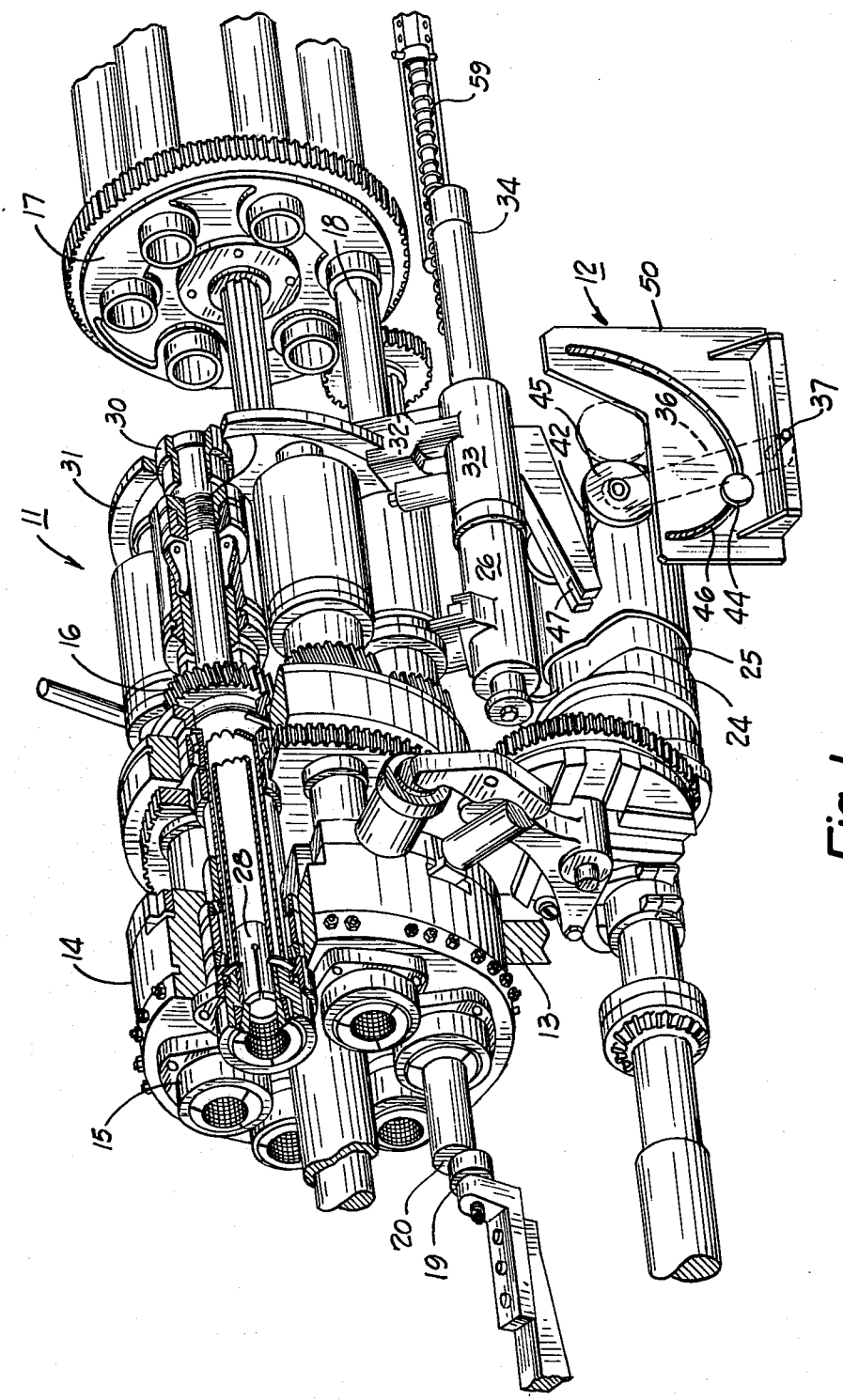
FIG. 1 is a perspective partial view of a machine tool with which the adjustable feed mechanism may be used.

FIG. 1 shows generally the entire machine tool 11 as an example of a machine with which the adjustable feed mechanism 12 of the present invention may be used. The adjustable feed mechanism 12 may be used with various types of machines which utilize or consume elongated stock such as wires or bars, and especially where an adjustable length of feed of the stock is desired. The machine tool 11 represents one form of such machine which has a frame 13 journalling a spindle carrier 14 for indexing movements into a plurality of positions equal in number to a plurality of spindles 15, shown here as six in number. Each of the spindles 15 is rotatable within the spindle carrier 14 through drive gears 16. A stock reel 17 is mounted to the rear of the machine 11 to contain a plurality of bars of stock, one for each spindle. Only one such bar of stock 18 is shown to avoid confusion in the drawing. This bar 18 is shown in the number one position of the spindles in the spindle carrier 14 and is shown moved forwardly until the exposed end 20 thereof strikes a movable stock stop 19 and this establishes the proper length of the exposed end 20 of the bar stock for machining the next workpiece in the machine tool 11.

Figure 2:
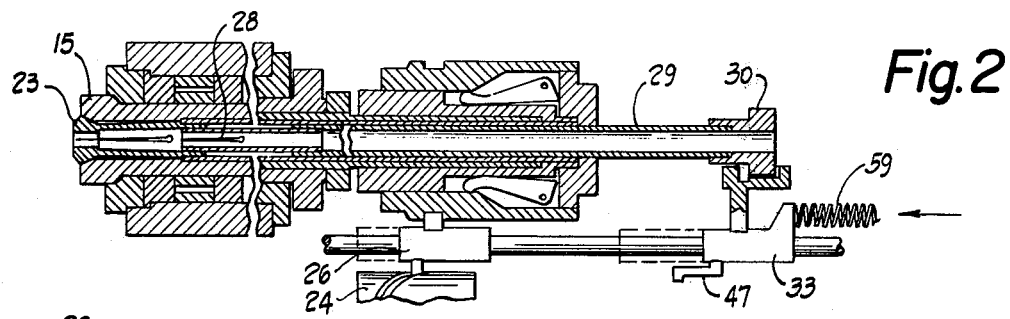
FIG. 2 is a longitudinal sectional view through a spindle of the machine tool showing the stock feeder mechanism.

Each spindle has a collet 23 at the nose of the spindle to grip the workpiece when closed as shown in FIG. 2. Each of the collets 23 is opened by a collet cam 24 mounted on a cam drum 25 which is driven at one revolution per operating cycle of the machine. The collet cam 24 actuates a collet operating slide 26 to actuate the collets 23 between the closed position shown in FIG. 2 and the open position shown in FIG. 3.

The adjustable feed mechanism 12 includes a stock feeder 28 which may be of many different types but as shown in this preferred embodiment is a stock pusher in the form of a collet having spring fingers. This stock pusher or feeder 28 is mounted inside each spindle 15 close behind the spindle collet 23. The stock feeder is mounted on the forward end of a pusher tube 29 and a collar 30 is mounted on the rear of each pusher tube 29. A stock feed ring 31 is mounted for indexing movements with the spindle carrier 14 and is axially movable to engage each of the collars 30 in sequence. This stock feed ring 31 engages only that particular collar 30 which is in the number one spindle position, namely the spindle position shown in FIG. 1 which contains the bar stock 18. This is the bar stock feed position of the spindle carrier 14 so that bars 18 may be fed forwardly to engage the stock stop 19.

The stock feed ring 31 is moved axially by a fork 32 carried on a stock actuator 33 which is longitudinally slidable on a slideway 34 in the frame 13. A support member 36 is provided in the frame 14 for movements in a path longitudinally of the frame 13. This support member may be a slide but is shown as an arm pivoted at the lower end thereof on a pivot 37. Actuator means is provided in the machine to move the support member 36 in a path through a given length stroke. This actuator means 35 may be manually actuated means such as a long lever extension on the support member 36 but in high production machines it is usually power actuated and is power actuated in the preferred embodiment. In this case the cam drum 25 includes a stock feed cam 38 coacting with a cam follower roller 39 as the actuator means 35 to actuate the support member 36. The cam follower roller 39 is connected to the support member 36 and in this preferred embodiment is mounted on a pivot axis 40 which is also the pivot axis for a wheel 41. This wheel 41 may be considered as a member which has a curved track, and in the preferred embodiment this curved track is a circular arc and the wheel 41 may pivot about this axis 40.

A transversely flexible elongated linkage 42 may include a chain but is shown as a flexible cable 42. Anchor means 43 and 44 are provided for the flexible elongated linkage 42. These anchor means 43 and 44 are means to connect the linkage 42 to act between the actuator means 35 and the stock actuator 33 with this cable 42 engaging at least a part of the curved track 45 on the wheel 41. The anchor means 43 anchors a first end of the cable 42 to an extension 47 secured forwardly on the stock actuator 33. The anchor means 44 anchors the second end of the cable 42 to a curved track 46. The curved track 46 is provided by a slot in a plate 50 secured to the frame 13. Either the curved track 45 or curved track 46 includes a volute curve and in the preferred embodiment the curved track 46 which is the slot in the plate 50 is a curve which is the involute of the circular wheel 41. Adjustable means 51 is connected to utilize a different portion of the involute curve to change the length of the bar stock feed to the machine tool 11. In the preferred embodiment this adjustable means 51 includes a manual handle 52 mounted on a threaded stud 53 which has a rectangular shank 54 sliding in the slot 46. The cable anchoring means 44 is mounted on the inner end of the stud 53 on the side of the plate 50 opposite from the handle 52. The rectangular portion 44 of the shank carries a pointer 55 for cooperation with a scale 56 carried on the plate 50. A nut 57 engages the threaded shank 53 for securing the anchoring means 44 at any desired point on the plate along the slot 46.

A spring 59 is a part of the actuator means 35 and is a means to urge the stock actuator in a forward longitudinal direction. This makes the cable 42 taut tending to move the support member 36 in a forward direction which is resisted by the cam follower roller 39 engaging the stock feed cam 38.

Operation

Figure 3:
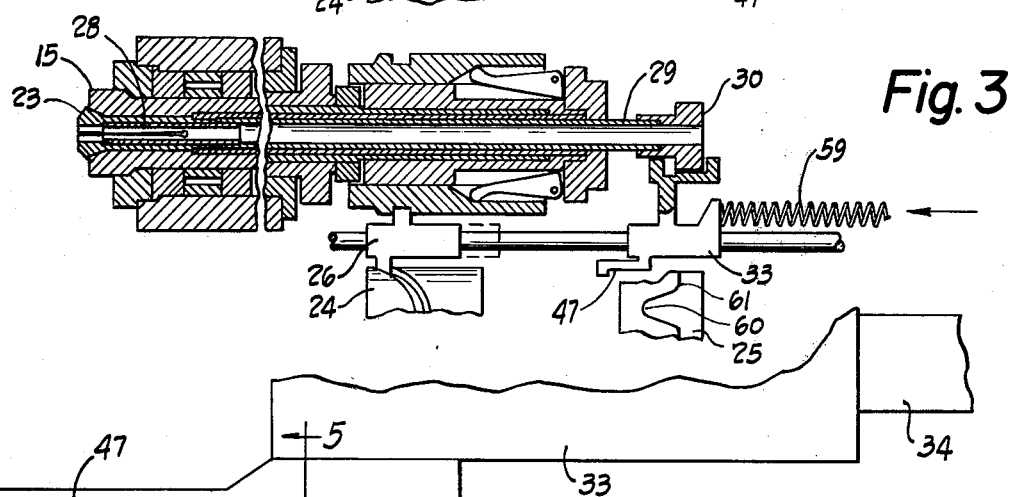
FIG. 3 is a longitudinal view similar to FIG. 2 with the stock feeder in the maximum forward position.

FIGS. 2 and 3 show the particular spindle which is in the number one position of the spindle carrier 14 which is the spindle position at which bar stock feed is accomplished. The machining time portion of rotation of the cam drum 25 is that which is important, and the idle time which is time when the workpiece is not being machined is always attempted to be made as short as possible. During this idle time the bar stock 18 is fed forwardly against the stock stop 19 and the arcuate rotation of the cam drum 25 to achieve this stock feed may be fairly small, for example, only 45 to 50 degrees of rotation. The bar 18 may be large and heavy, for example 2.5 inches in diameter and 16 feet long and it has to be accelerated longitudinally from the rest, brought up to a maximum speed and then before abutting the stock stop 19 decelerated so that it will not bounce back from this stock stop. Accordingly, a sinusoidal movement for the longitudinal acceleration and deceleration of the bar 18 is generally preferred. The stock feed cam 38 preferably has this sinusoidal shape. During the stock feed portion of the operating cycle, first, the collet 23 starts to open by means of the collet cam 24 acting through the collet operating slide 26. Next, the cam follower roller 39 starts down the incline of the stock feed cam 38 toward the low point or forward point 60 of this stock feed cam 38. When the cam follower roller 39 reaches the forward point 60, then the bar stock 18 has been fed forwardly, as explained below, and then the collet cam 24 closes the collet 23. This may take only 45 to 50 degrees of rotation on the cam drum 25.

Figure 4:
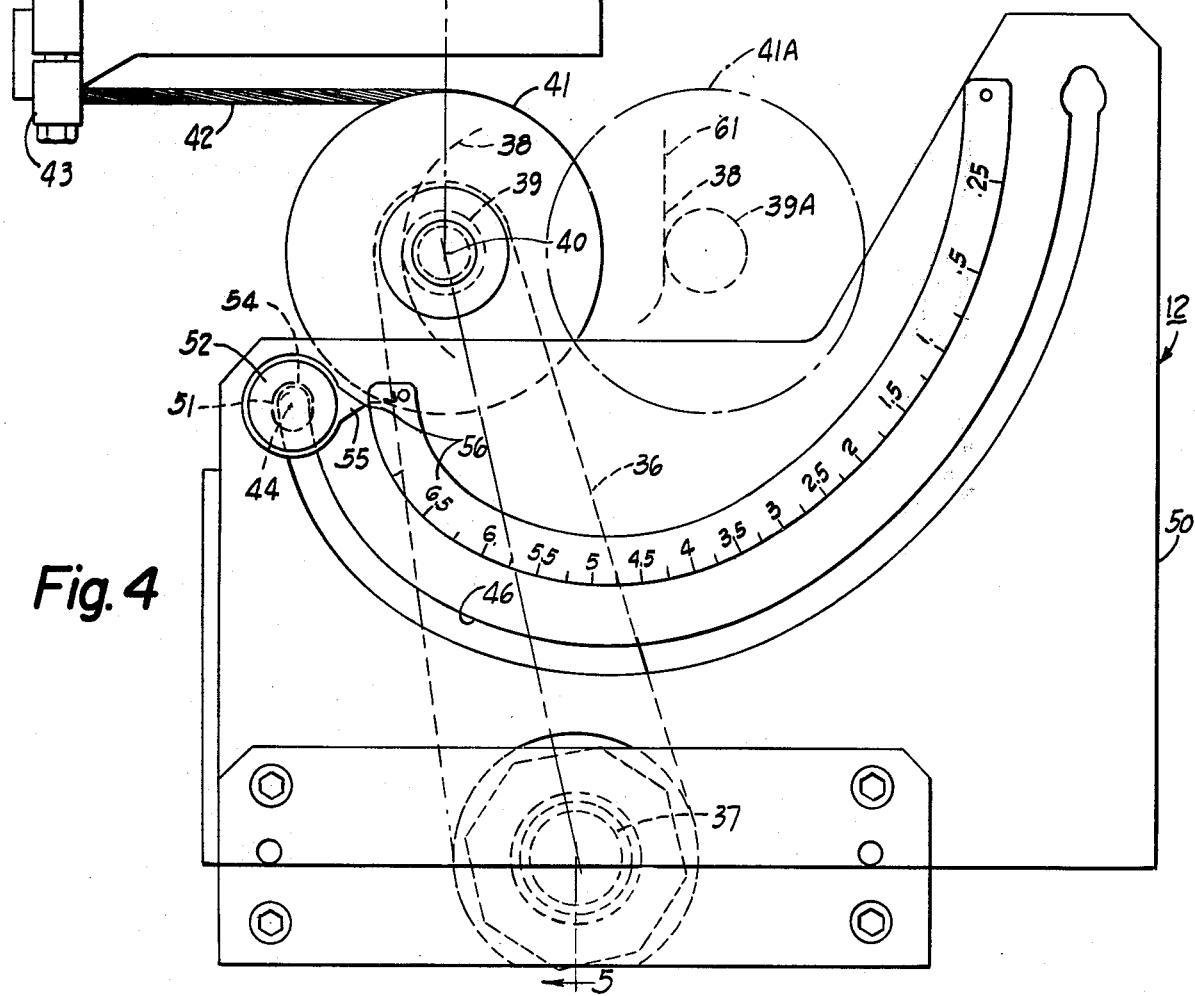
FIG. 4 is a front elevational view of the adjustable feed mechanism of the invention.
Figure 5:
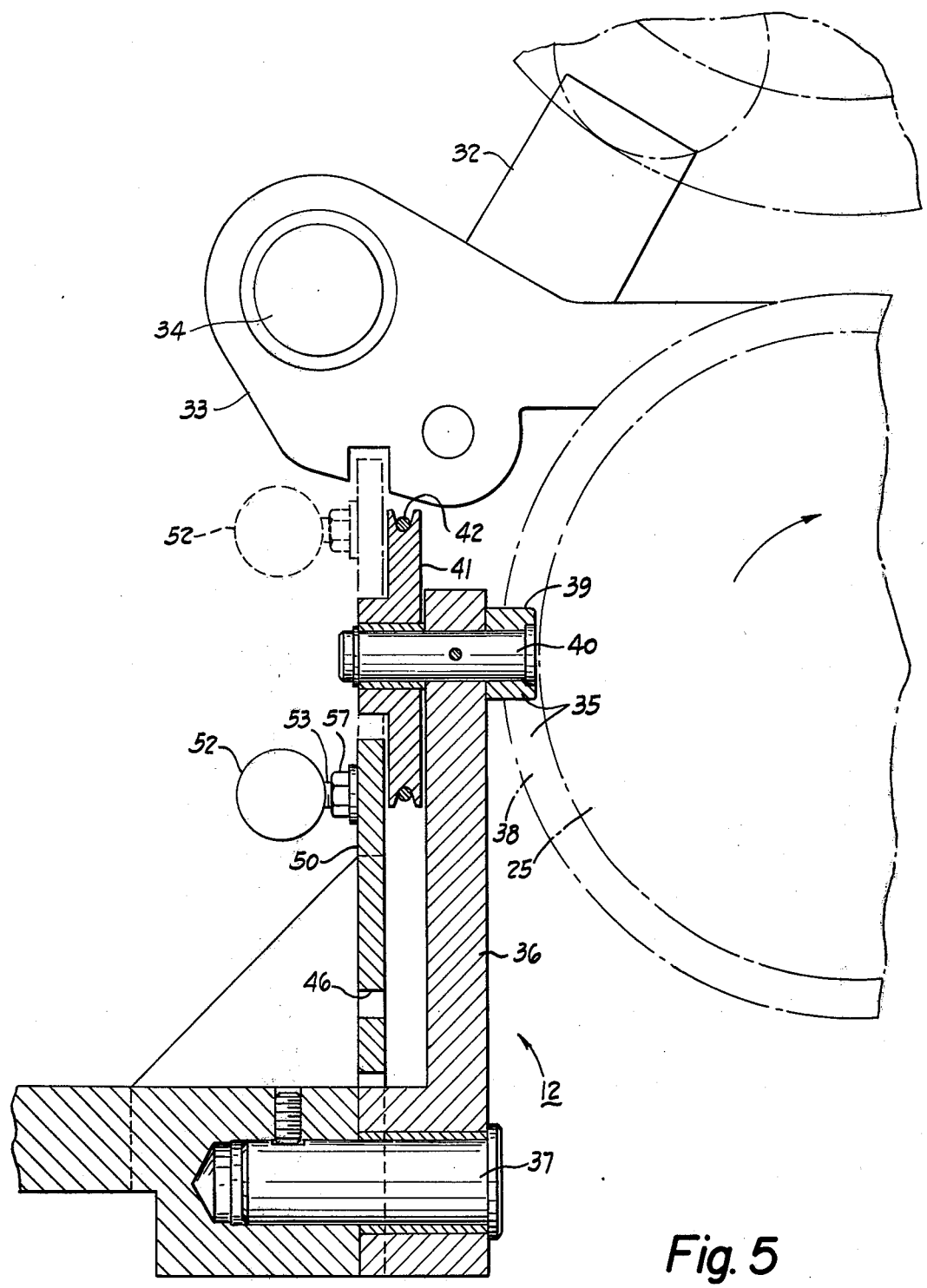
FIG. 5 is a sectional view on line 5—5 of FIG. 4.

For most of the operating cycle of the machine tool 11, the cam drum 25 is in a position whereat the cam follower roller 39 rides on the high area 61 of the cam 38 and is urged against this high area by the spring 59. FIGS. 1 and 4 show the support member 36 in its forwardmost position whereat the bar stock 18 is fed forwardly to engage the stock stop 19. In this position the wheel 41 is in its most forward position. A position 41A is shown in phantom in FIG. 4 and this is the rearmost position of the wheel 41 as established by the high area 61 of the cam 38. As shown in FIGS. 1 and 4, the handle 52 may be adjusted to any desired position along the length of the involute curve slot 46. FIG. 4 shows this handle in the maximum stroke position as shown by the pointer 55 and scale 56, this may be, for example, 7 inches of stroke for the bar stock 18. The cam follower roller 39 is shown in FIG. 4 and the phantom position 39A is the position of this cam follower roller when it engages the high area 61 of the stock feed cam 38. From FIG. 4 it will be seen that the excursion of this cam follower roller 39 is a fixed length determined by the stock feed cam 38 and as an example this excursion might be 3.5 inches. Thus it will be seen that the linkage including the cable 42 is a motion amplifying linkage which amplifies the motion of the cam follower roller 39 to achieve an even greater length of motion of the stock actuator 33.

With the handle 52 positioned at the 7 inches mark as shown in FIG. 4, there as the cam follower roller 39 moves from the phantom position 39A to the forward position of FIG. 4, the spring 59 will move the stock actuator 33 to the left as viewed in FIGS. 1 and 4 by a greater distance, 7 inches in this particular example. The stock actuator 33 acts through the fork 32, stock feed ring 31, the collar 30 in the number one spindle position, the pusher tube 29 and the stock feeder or stock pusher 28 to move the bar stock 18 forwardly. This is the motion from the position of FIG. 2 to the position of FIG. 3.

The handle 52 is shown positioned at about 5.5 inch mark in FIG. 1. In this case, the cable 42 is partly unwrapped from its engagement with the curved track of the wheel 41. This would be during set up of a new machining operation and if the cam roller 39 is in the phantom position 39A of FIG. 4 at this time, then it will be noted that the upwrapping of the cable from the periphery of the wheel 41 will permit the cable to move counterclockwise and the anchor 43 end of cable 42 will move to the left about 1.5 inches due to this unwrapping movement, by movement of the handle 52 along the involute track 46. Consequently, when the stock feed occurs, and the cam follower roller 39 moves to the left in FIG. 4 through its fixed length stroke, the stock actuator 33 will move the remaining distance of 7 inches minus 1.5 inches or 5.5 inches of feed movement. Thus the maximum forward feed position of the stock actuator will remain the same, and as shown in FIG. 3 the stock pusher 28 will be very closely adjacent the rear of the spindle collet 23. This is an important advantage of the present invention. In some prior art mechanisms the maximum forward feed position was not a constant and as a result the full length of the bar stock could not be utilized. It will be appreciated that if the maximum forward position of the stock pusher 28 were that as shown in FIG. 2, then the last several inches of the bar stock could not be fed forwardly in the collet 23 and hence this would have to be removed by hand and would be waste. This is avoided by the present invention because the maximum amount of bar stock is fed forwardly leaving only the last small amount of bar stock which can safely be gripped by the spindle collet 23.

The handle 52 may be moved by loosening the nut 57 and moving the stud 53 in the slot 46. If now when the cam follower roller 39 is engaging the high area 61 of the stock feed cam 38, as shown by the the phantom position 39A of FIG. 4, if the handle 52 is moved to a position, for example, at the one inch mark, this will unwrap still more of the cable from its engagement with the wheel 41 and cause a still further counterclockwise movement of the cable 42. The anchor 43 of the cable 42 will now have moved forwardly to the left a total of six inches, compared to its initial position when the handle 52 is in the 7 inch position in FIG. 4. Now when the cam follower roller 39 is moved through its given length stroke to the left, the cable 42 will move to the left only the remaining one inch of movement, namely 7 inches minus 6 inches equal 1 inch of movement. This will feed the bar stock 18 forwardly to the left by one inch to engage the stock stop 19.

Regardless of the infinitely adjustable position along the curved track 46, one will note that the sinusoidal movement of bar feed, as established by the stock feed cam 38, is preserved by the present adjustable feed mechanism 12. This provides smooth and even acceleration of the often heavy bar stock 18 to a maximum velocity and then smooth and even deceleration to a stop as determined by the stock stop 19.

The curved track 46 is a volute or spiral curve and preferably is an involute curve formed as an involute relative to the circumference of the wheel 41 when in the solid line position shown in FIG. 4. By this means, the amount of stock feed may easily be set. Preferably the amount of stock feed is adjusted during set up of the machine for a different machining operation and in such case the cam drum 25 would be inched around until the cam follower 39 is at the forward point 60 of this stock feed cam 38. This will be the solid line position shown in FIG. 4. In this position the nut 57 may be loosened and the handle 52 moved anywhere along the slot 46 without any substantial movement to the stock actuator 33. The reason is that this curve 46 is an involute curve and movement of the handle 52 merely unwraps a cable from engagement with different portions of the wheel 41. When the pointer 55 indicates the desired amount of stock feed among the infinitely variable adjustments provided, the nut 57 may be tightened to retain this anchoring means 44 in the desired position.

The transversely flexible elongated linkage 42 may be a chain and the wheel 41 may be a chain sprocket, although they have been shown as a flexible cable and a cable pulley, respectively. It will be noted that both the wheel 41 and the slot 46 provide a curved track with one of these including a volute curve. In the preferred embodiment the slot 46 provides the volute curve and the adjustable means 51 is connected as desired to utilize different portions of this volute curve to change the length of the stock feed. The changed position of the anchor means 44 along the volute curve 46 also changes the extent of peripheral engagement between the cable 42 and the wheel 41. This wheel 41 may be considered a curved track member engaged by the linkage 42. This engagement with the wheel 41 rotates the curved track member 41 about the pivot axis 40 during the feed of bar stock. In the preferred embodiment the wheel 41 has a circular arc track which is engaged by the cable 42.

After the stock has been fed forwardly by motion of the cam follower 39 from the high area 61 to the forward point 60 of the stock feed cam 38, then continued rotation of the cam drum 25 retracts the stock pusher 28 despite the urging of the spring 59.

The adjustable means 51 adjusts the connection means or anchor means 44 in its point of co-action between the linkage 42 and the curved track 46.

The present invention utilizes a linkage which is a motion amplifying linkage. Previously in the prior art stock feeding it was quite difficult to feed long lengths because then the angle on the stock feed cam between high and low points 61 and 60 became so great while still retaining only, e.g. 50 degrees of cam drum rotation, that excessive stress was placed on the cam and cam follower and other parts. Now according to the present invention the length of feed of the stock may be twice the length of the fixed stroke of the cam follower 39.

Due to the motion multiplying nature of the linkage 42 and wheel 41, it will be noted that the adjustable means 51 changes the amount of stock feed from a minimum less than the length of the stroke of the cam follower roller 38 to a maximum greater than this given length of stroke. In the preferred embodiment, with the involute curved track 46 constructed as shown in FIG. 4, the adjustable means acts to change the amount of stock feed from a minimum of substantially zero to a maximum substantially twice said given length of stroke of the cam follower roller 39.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An adjustable feed mechanism for feeding elongated stock to a machine, comprising, in combination,
   a frame,
   a stock feeder positioned to feed elongated stock to the machine,
   a support member mounted for movements in a path on said frame,
   actuator means connected to move said support member in said path through a given length stroke,
   a member having a curved track,
   a transversely flexible elongated linkage,
   means to connect said linkage to act between said actuator means and said stock feeder and engaging at least part of said curved track,
   means establishing a curve which is the involute of a circle on one of said connection means and said curved track,
   and adjustable means connected to utilize a different portion of said involute curve establishing means to change the length of elongated stock feed to the machine.

2. An adjustable feed mechanism as set forth in claim 1, wherein said feed mechanism includes a stock actuator mounted for longitudinal movements in said frame and positioned to act on said stock feeder,
   and said connection means connects said linkage to said stock actuator.

3. An adjustable feed mechanism as set forth in claim 2, wherein said connection means connects said elongated flexible linkage between said stock actuator and said frame.

4. An adjustable feed mechanism as set forth in claim 1, wherein said curved track member is journaled for at least partial rotation about a pivot axis,
   and said elongated linkage engages part of said curved track to rotate the curved track member about said pivot during stock feed.

5. An adjustable feed mechanism as set forth in claim 4, wherein said curved track member has a circular arc track thereon engaged by said flexible elongated linkage.

6. An adjustable feed mechanism as set forth in claim 1, wherein said flexible elongated linkage is a flexible cable engaging said curved track.

7. An adjustable feed mechanism as set forth in claim 1, wherein said adjustable means includes adjustment of part of said connection means to adjustably connect one part of said cable whereby said cable engages different extents of said curved track to change the length of stock feed.

8. An adjustable feed mechanism as set forth in claim 1, wherein said adjustable means adjusts said connection means as a variable anchor point on said involute curve establishing means.

9. An adjustable feed mechanism as set forth in claim 1, wherein said involute curve establishing means establishes substantially identical forward feed positions of the fed stock regardless of the adjustable length of the stock feed.

10. An adjustable feed mechanism as set forth in claim 1, wherein said actuator means includes a cam journaled for rotation in said frame,
    a cam follower co-acting with said cam,
    and said cam and cam follower being connected to move said support member in said path through said given length stroke.

11. An adjustable feed mechanism as set forth in claim 6, wherein said actuator means also includes urging means urging said cam follower into engagement with said cam and urging said stock feeder toward the forward feed position of the fed stock relative to the machine,
    and said cam is positioned to act on said cam follower to retract said cam follower and said stock feeder despite the urging of said urging means.

12. An adjustable feed mechanism as set forth in claim 11, wherein said given length stroke is a fixed length under all conditions and said adjustable means changes the length of stock feed to the machine with a substantially constant forward feed position of said stock feeder.

13. An adjustable feed mechanism as set forth in claim 1, wherein said involute curve establishing means establishes an involute curve on said curved track,
    and said adjustable means adjusts said connection means by adjusting a point of co-action between said linkage and said curved track.

14. An adjustable feed mechanism as set forth in claim 13, wherein said curved track includes a curved slot in a plate.

15. An adjustable feed mechanism as set forth in claim 14, wherein said linkage is a flexible cable having one end connected by said connection means to a point on said plate at said curved slot,
    and said adjustable means adjusts the position along said curved slot of the plate to which the cable is connected.

16. An adjustable feed mechanism as set forth in claim 15, wherein said involute curve establishing means establishes said curved slot as an involute curve,
    and means mounting said plate in an orientation whereby with the stock feeder in the forward feed position, the adjustable means may be moved to any position along said involute curved slot without any substantial change in said forward feed position of the stock feeder.

17. An adjustable feed mechanism as set forth in claim 14, wherein said adjustable means includes a manual handle slidable in said slot and securable along the slot to said plate.

18. An adjustable feed mechanism as set forth in claim 1, including means establishing said linkage as a motion multiplying linkage whereby said adjustable means acts on said connection means to change the amount of stock feed from a minimum less than said given length stroke to a maximum greater than said given length stroke.

19. An adjustable feed mechanism as set forth in claim 18, wherein said adjustable means together with said motion multiplying linkage establishes an adjustable amount of stock feed from a minimum of substantially zero to a maximum substantially twice said given length stroke.

* * * * *